(12) United States Patent
Goetz et al.

(10) Patent No.: US 8,347,284 B2
(45) Date of Patent: *Jan. 1, 2013

(54) METHOD AND SYSTEM FOR CREATION OF OPERATING SYSTEM PARTITION TABLE

(75) Inventors: Dennis R. Goetz, Research Triangle Park, NC (US); Gregory B. Pruett, Research Triangle Park, NC (US); Linda A. Riedle, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/821,282

(22) Filed: Jun. 23, 2010

(65) Prior Publication Data

US 2010/0274877 A1 Oct. 28, 2010

Related U.S. Application Data

(62) Division of application No. 11/192,926, filed on Jul. 29, 2005, now Pat. No. 7,761,867.

(51) Int. Cl.
*G06F 9/44* (2006.01)
(52) U.S. Cl. .................................................. 717/174
(58) Field of Classification Search .................... None
See application file for complete search history.

(56) References Cited

U.S. PATENT DOCUMENTS

| | | | | |
|---|---|---|---|---|
| 6,351,850 | B1* | 2/2002 | van Gilluwe et al. | 717/175 |
| 6,366,911 | B1* | 4/2002 | Christy | 707/737 |
| 2003/0046371 | A1* | 3/2003 | Falkner | 709/220 |
| 2006/0195839 | A1* | 8/2006 | Lin et al. | 717/174 |
| 2006/0248328 | A1* | 11/2006 | Iszlai et al. | 713/2 |
| 2008/0195640 | A1* | 8/2008 | Iszlai et al. | 707/100 |
| 2008/0209019 | A1* | 8/2008 | Iszlai et al. | 709/222 |

* cited by examiner

*Primary Examiner* — Philip Wang
(74) *Attorney, Agent, or Firm* — Steven M. Greenberg, Esq.; Carey, Rodriguez, Greenberg & O'Keefe

(57) ABSTRACT

A system and method for automatically selecting and configuring storage devices according to an abstract partition table definition as part of a scripted operating system installation. The system has a deployment server in data communication with the one or more computers via the communication network. The deployment server has a deployment server storage device and a central processing unit. The deployment server storage device stores an inventory of the computers to which an operating system is to be deployed and a set of partition table requirements defined by one or more qualitative attributes associated with one or more computer storage device partitions. The central processing unit is in communication with the deployment server storage device and executes functions to map the inventory with the set of partition table requirements to create a partition table for each computer to which the operating system is to be deployed.

17 Claims, 4 Drawing Sheets

| PART. TYPE | LOCALITY | TYPE | RELIABILITY | AVAIL. | PERF. | DISK USAGE | MIN. SIZE | MAX. SIZE |
|---|---|---|---|---|---|---|---|---|
| / | local | any | any | any | any | any | 1,000 | 1,000 |
| /swap | local | any | any | any | any | any | 500 | 1,000 |
| /opt | any | redundant | any | any | any | any | 50,000 | all |
| /database | any net. att. | redundant | high | any | any | any | 1,000,000 | all |

FIG. 3

| DRIVE TYPE | LOCALITY | TYPE | RELIABILITY | AVAIL. |
|---|---|---|---|---|
| IDE | local | non-redundant | high | low |
| fibre-attach | fibre-attach | non-redundant | high | high |
| NAS | net-attach | redundant | high | high |
| RAID | local | redundant | high | high |

FIG. 4

| PARTITION TYPE | PARTITION NAME | MOUNT POINT | SIZE |
|---|---|---|---|
| / | /dev/hda1 | IDE | 1,000 |
| /swap | /dev/hda2 | IDE | 1,000 |
| /opt | /dev/sda1 | fibre-attach | 50,000 |
| /database | /dev/sdb2 | fibre-attach | 1,000,000 |

| PARTITION TYPE | PARTITION NAME | MOUNT POINT | SIZE |
|---|---|---|---|
| / | /dev/hda1 | RAID | 1,000 |
| /swap | /dev/hda2 | RAID | 1,000 |
| /opt | /mnt/opt | NAS | 50,000 |
| /database | /mnt/data | NAS | 1,000,000 |

METHOD AND SYSTEM FOR CREATION OF OPERATING SYSTEM PARTITION TABLE

CROSS-REFERENCE TO RELATED APPLICATIONS

This application is a Divisional of U.S. application Ser. No. 11/192,926, filed Jul. 29, 2005, entitled "METHOD AND SYSTEM FOR CREATION OF OPERATING SYSTEM PARTITION TABLE," the entirety of which is incorporated herein by reference.

BACKGROUND OF THE INVENTION

1. Statement of the Technical Field

The present invention relates to operating system deployment, and in particular to a system and method for deploying an operating system to remote computing hardware independent of the storage media associated with the remote computing hardware.

2. Description of the Related Art

With the ever-increasing demand for computing resources, many organizations are turning to remote operating system deployment as a way to quickly and efficiently install an operating system on a computer. When remotely deploying an operating system, one or more central deployment computers typically are used to "push" the operating system to the remote computing hardware. Such remote computing hardware can be desktop computers, servers, laptop computers or any other computing device that requires the installation of an operating system. In addition to storage devices within the computer chassis itself, such as Integrated Device Electronics ("IDE") and Small Computer System Interface ("SCSI") drives, these computers may also need mappings to remote storage devices such as network attached storage ("NAS"), fiber-attached, infiniband-attached, etc. devices as well as redundant arrays of independent disks ("RAID") storage.

Typically, a user responsible for operating system ("OS") deployment configures the deployment computer to execute a series of deployment tasks. Such tasks might include which operating system to deploy (WINDOWS, LINUX, etc.) as well as the drive (storage device) partitions and mappings. The deployment computer maintains an inventory of the hardware deployed in the network. The inventory can be derived using known automated techniques or manually configured. Such inventory includes media access control ("MAC") addresses associated with the hardware. When the computing hardware is connected to the network and powered on, known techniques such as "boot to network" and dynamic host configuration protocol ("DHCP") are used to establish an interne protocol ("IP") address and preboot operating system for the device. In addition, current remote OS deployment systems and methods rely on a partition table to establish how the storage devices, also referred to herein as hard drives and hard disks, will be partitioned. Drive partitioning refers to the creation of logical divisions on a physical hard disk that allows one to apply operating system-specific logical formatting. The result is that partitions function as if each partition is a separate hard drive.

Current OS deployment systems require the use of tightly bound partition table definitions to map the OS installation into specific storage hardware. This is especially problematic when there is a need to install the OS on disparate hardware because the user must create separate installation tasks for each different type of hardware configuration upon which the OS will be installed. For example, when installing the Linux OS, the device name must be specified as part of the partition, such as, "hda" for an IDE drive and "sda" for a SCSI drive.

Using the Linux OS example, current OS deployment management systems, if a user had two different computers in the network such as a computer with one IDE device and another with one SCSI drive, the user would have to create two separate installation tasks to deploy the same version of Linux to each. As a more complicated example that presents a greater problem, assume the two different computers in the network were configured such that one computer has an IDE drive and a RAID SCSI drive and the other computer has only a RAID SCSI drive. If the deployment management software simply deployed the Linux OS to the first drive recognized by the OS, then Linux would be deployed to the IDE drive on the first computer and the RAID SCSI drive on the second computer. This may or may not be what the user intended. If the user wanted the OS to be installed on a redundant drive such as the RAID SCSI drive, then the installation on the first computer was made to the wrong drive.

This problem is further exacerbated as remote storage devices are brought into the picture because the conceivable combinations of available storage devices becomes quite large. For example, a computer may have locally attached IDE drives, locally attached SCSI drives, locally attached IDE RAID drives at different RAID levels, locally attached SCSI RAID drives having different RAID levels, NAS drives at different RAID levels, iSCSI ("Internet SCSI") drives at different RAID levels and fibre-attached drives at different RAID levels. In this scenario, deploying an OS to the first recognized drive is unlikely to meet the user's deployment requirements. Similarly, requiring the user to manually create separate deployment tasks for each conceivable combination is inefficient, time consuming, onerous and ripe for configuration errors. Accordingly, it is desirable to have a system and method for the deployment of an OS which allows the creation and specification of the installation partition table definitions that is independent of the specific storage devices in the network and on the computers.

SUMMARY OF THE INVENTION

The present invention addresses the deficiencies of the art in respect to the remote deployment of operating systems and provides a novel and non-obvious system and method for the specification of OS partition tables without the need to define specific partition tables for each different hardware configuration in the deployment environment. In this regard, the deployment system is arranged to automatically create the partition table for each hardware configuration in the network inventory based on a set of general parameters predefined by the user.

According to one aspect, the present invention provides a system for remotely deploying an operating system to one or more computers using a communication network. The system has a deployment server in data communication with the one or more computers via the communication network. The deployment server has a deployment server storage device and a central processing unit. The deployment server storage device stores an inventory of the computers to which an operating system is to be deployed and a set of partition table requirements defined by one or more qualitative attributes associated with one or more computer storage device partitions. The central processing unit is in communication with the deployment server storage device and executes functions to map the inventory with the set of partition table requirements to create a partition table for each computer to which the operating system is to be deployed.

According to another aspect, the present invention provides a method for remotely deploying an operating system to one or more computers using a communication network in which an inventory of the computers to which an operating system is to be deployed and a set of partition table requirements defined by one or more qualitative attributes associated with one or more computer storage device partitions is stored. The inventory is mapped with the set of partition table requirements to create a partition table for each computer to which the operating system is to be deployed.

According to still another aspect, a machine readable storage device having stored thereon a computer program for remotely deploying an operating system to one or more computers using a communication network is provided in which the computer program, when executed performs a method including storing an inventory of the computers to which an operating system is to be deployed and a set of partition table requirements defined by one or more qualitative attributes associated with one or more computer storage device partitions. The inventory is mapped with the set of partition table requirements to create a partition table for each computer to which the operating system is to be deployed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is an exemplary chart of a set of partition table requirements for a Linux OS deployment;

FIG. 4 is an exemplary chart of storage devices and their associated relative attributes based on the attributes in FIG. 3.

DETAILED DESCRIPTION OF THE PREFERRED EMBODIMENTS

Figure 1:
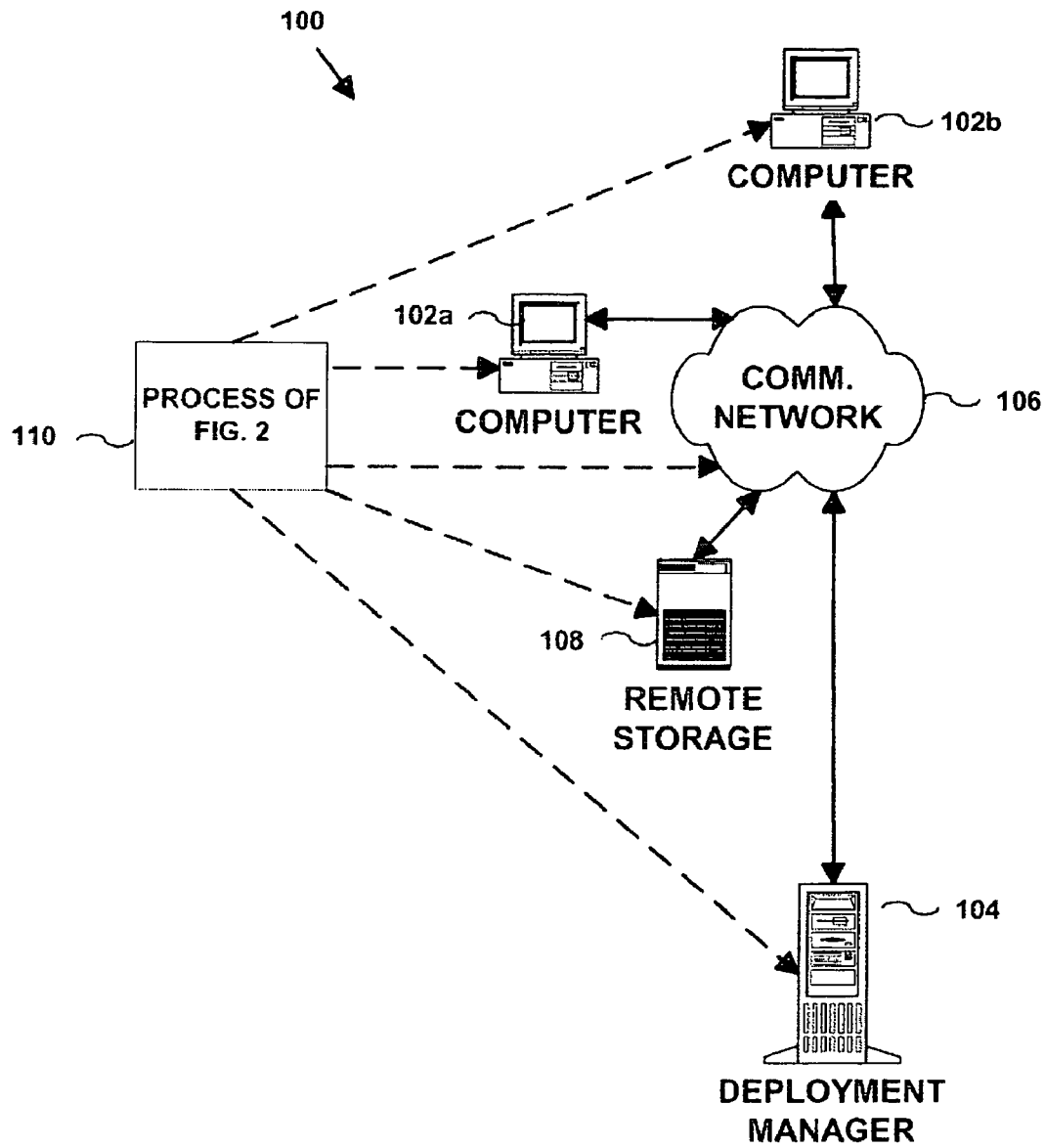
FIG. 1 is a block diagram of an operating system deployment system constructed in accordance with the principles of the present invention.

The present invention advantageously provides a remote OS deployment method and system advantageously arranged to automatically create the partition table for each hardware configuration in the network inventory based on a set of general parameters predefined by the user. Referring now to the drawing figures in which like reference designators refer to like elements there is shown in FIG. 1 a deployment system constructed in accordance with the principles of the present invention and designated generally as "100". System 100 includes one or more computers, such as computer 102a and 102b (referred to collectively herein as computers 102) to which an operating system is to be deployed, coupled to a deployment management server 104 through communication network 106. System 100 can also include one or more network attached storage devices 108 arranged to communicate with computers 102 and/or deployment management server 104 via communication network 106. Network 106 can be any computer network capable of transporting data between client computers 102, deployment management server 104 and/or network attached storage device 108, such as a transmission control protocol/internet protocol ("TCP/IP") network.

As used herein, the term "data" includes all forms of digital communication including but not limited to alpha-numeric information, audio, video, and any other form of encoded or encrypted information. Further, although deployment management server 104 and computers 102 are shown as separate elements in FIG. 1 and are described separately herein, it is understood that computers 102 and deployment management server 104 can be implemented as a single physical unit with the functions of each device performed by one or more processing units and associated computing hardware in one or more physical chassis.

Computers 102 can be any computing device capable of remotely receiving an operating system, such as Linux, from a deployment server. For example, client computer 102 can be a desktop or laptop computer, a personal digital assistant ("PDA") and the like. Client computer 102 includes hardware components as known in the art and as may be required to implement the functions of the present invention described herein. Of note, although the present invention is described herein with reference to the deployment of the Linux OS, it is understood that the present invention can equally be used to remotely deploy other operating systems such as WINDOWS. For example, client computer 102 can include one or more storage units such as IDE, SCSI and RAID drives, additional volatile or non-volatile memory, a central processing unit, input and output devices, network interface hardware, display units and the like, controllable by an operating system and/or one or more application software programs.

Similarly, deployment server 104 generally includes the same types of hardware components described above with respect to computer 102. As is described below in detail, server 104 is arranged to deploy an OS to computer 102 based on the inventory of computer 102, including the available network attached storage devices 108, and partition table definitions stored, for example, in the volatile or non-volatile storage device within or associated with deployment server 104. Although the term "server" is used with respect to the computer running the deployment management software, it should be realized that the term "server" is used merely as a convenience herein to distinguish the computer running the deployment management software from the other computers in system 100, such as computers 102, that are the recipients of the deployed OS. Put another, way, deployment server 104 is not limited to a computer running a server-based operating system or performing traditional server tasks such as multi-user file and database storage, print server services, etc.

Although not shown, as described above, system 100 can also include other types of storage devices coupled to computers 102 such as fiber-attached, infiniband-attached, etc. OS deployment process 110 is performed by deployment server 104, in conjunction with client computers 102, communication network 106, NAS devices 108 and/or other storage device types within system 100.

Figure 2:
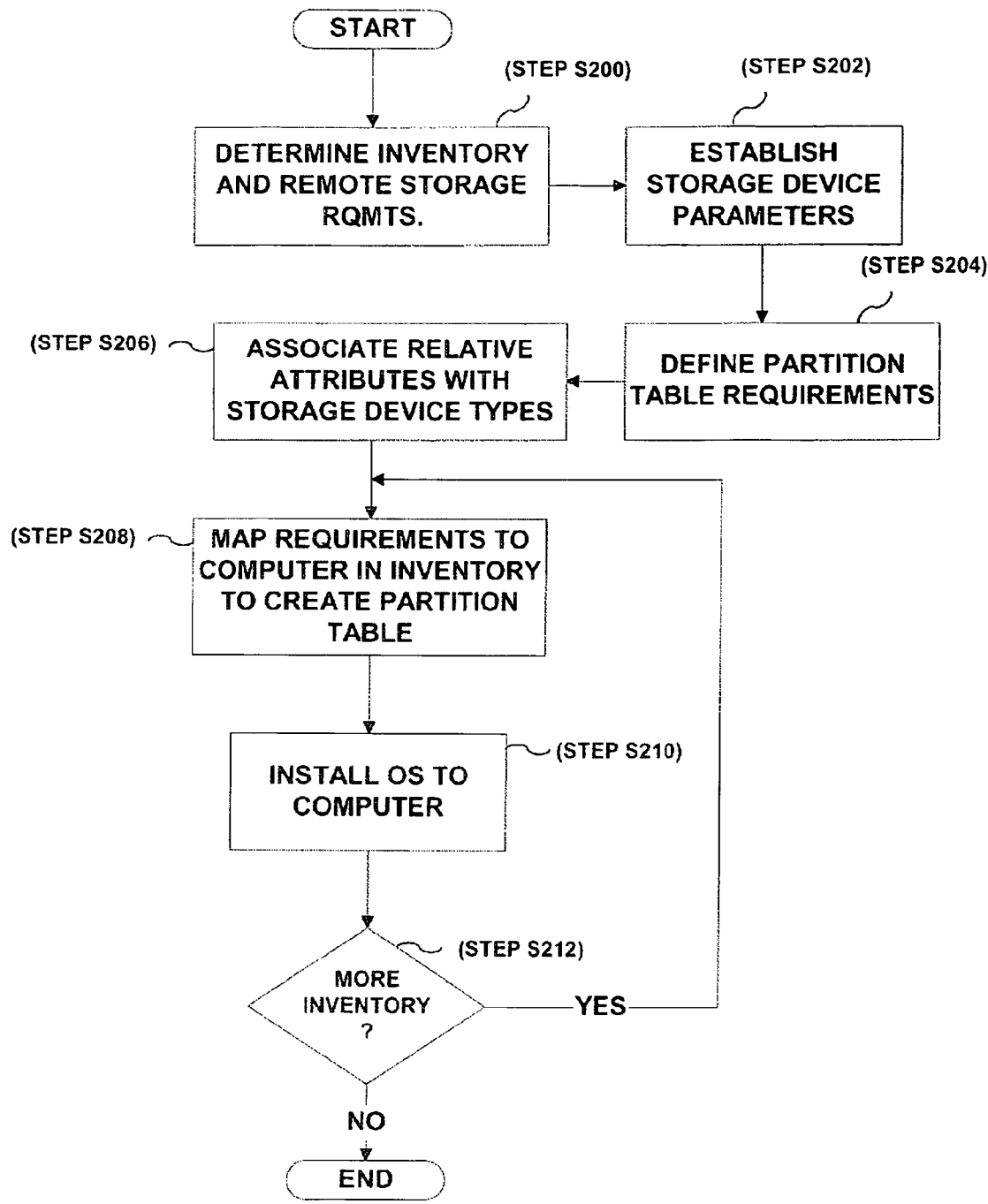
FIG. 2 is a flow chart of the partition table creation process of the present invention.

The overall process, OS deployment process 110, of the invention is described with reference to FIG. 2. Initially, the inventory of the computers 102 and remote storage devices 108 in the network is determined (Step S200). Methods for determining network inventories are known and can include automated discovery techniques as well as manual configuration. The inventory is typically stored in deployment server 104. Such inventory includes the storage devices in or associated with computers 102. In addition, remote storage, i.e., mapping requirements using devices such as NAS 108, fibre-attached, infiniband attached, are determined and the remote storage devices are configured, if necessary, to support the remote mappings that may result from the OS deployment. Such configuration can be performed remotely using deployment server 104.

The general parameters for the OS partition table deployment are determined (Step S202). Such parameters are the attributes that can be associated with and used to define the storage devices. These parameters allow an operator to define the partition table requirements for the OS deployment at a general level, without regard to the specific inventory. For example, Table 1 shows a list of exemplary qualitative attributes used to describe the partition requirements for a given system.

TABLE 1

| Attribute | Possible Values |
| --- | --- |
| Locality | Any, Local, Any Network-attached, Ethernet Network-attached (NAS/iSCSI), Fibre-attached or Infiniband attached |
| Type | Any, Non-redundant, Redundant |
| Reliability | Any, Low, High |
| Availability | Any, Low, High |
| Performance | Any, Low, Medium, High |
| Disk SpaceUsage | Any, Minimize |
| Minimum Size | <integer in Megabytes> |
| Maximum Size | <integer in Megabytes>, <% usage>, All |

As shown in Table 1, Locality refers to the location of the storage device where "local" refers to a storage device that is present within the computer 102, Type refers storage device redundancy, such as might be found within a SCSI device, Reliability refers to the relative reliability among possible storage devices. For example, a local bus attached storage device might be considered more reliable than a network attached storage device. With respect to availability, a hot pluggable RAID 1 array might be considered more available than a non-hot pluggable RAID 1 array. Performance is a relative term associated with the various storage device types. Disk space usage refers to how much space the deployed OS should be configured to occupy once installed, e.g., how many different OS modules/functions might be installed. Minimum size and maximum size refer to the size of the storage device and/or how much space is available on the potential storage device.

Of course, the attributes and values shown in Table 1 are exemplary and a user may not wish or need to specify values for all of the attributes. For example, a user may not wish to specify the minimum and maximum sizes. Where developers want to require the specification of a value for an attribute, "Any" or some other suitable term/value can be used. OS deployment system developers can establish other attributes, values based on the specific needs of the network upon which an OS is to be deployed. Of note, Step S202 can be performed well in advance of deployment and can be integrated as part of the deployment system software resident on deployment server 104. In other words, the attributes and possible values used to establish the partition table requirements can be pre-determined and "hard coded" as part of the OS deployment system software.

Once the qualitative attributes and values have been determined, they are used to define partition table requirements (Step S204). An exemplary chart of a set of partition table requirements for a Linux OS deployment is shown in FIG. 3. Such a chart, shown as chart 300, is created by a user responsible for OS deployment. Methods for accepting input from the user to create the chart, such as through a graphical user interface, are known and are not described herein. As may be readily observed, chart 300 provides qualitative values which are evaluated by deployment server 104 during the partition table creation and OS deployment steps. In this regard, a user can advantageously create one generalized task for OS deployment, independent of the specific inventory. For example, referring to FIG. 3, partition type "/" has been specified as using a local drive of any storage type, reliability, availability, performance as long as it has a minimum size of 1,000 MB and a maximum size of 1,000 MB. The drive associated with this partition type has no requirement that disk space usage be minimized. In contrast, the user has specified that partition type "/database" be a redundant network-attached device having high reliability, any availability and performance, with a minimum size of 1,000,000 MB. The drive associated with this partition type has no requirement that disk space usage be minimized.

Referring again to FIG. 2, whether "hard coded" or created by the user, a list of possible storage devices and their associated relative attributes is also established and stored on deployment server 104 (Step S206). Such an association can be made using an association chart that associates particular types storage drives with qualitative attributes, an example of which is shown as association chart 400 in FIG. 4, by a set of rules defining the relative values with respect to different storage device types, e.g., a hot pluggable RAID 1 array is more available than a non-hot pluggable RAID 1 array or a combination of the two. As is shown in exemplary association chart 400, IDE drives are defined as non-redundant local drives, having high reliability and low availability while RAID drives are defined as redundant local drives, having high reliability and high availability.

Association chart 400 can be expanded to include other attributes, such as drive size, if the user wants to use such a chart to define specific drives that are known or could possibly be in the system. However, deployment server 104 can take the drive size into account without inclusion in association chart 400 during partition table creation because server 104 has knowledge of the specific network inventory, such as the computers 102 and the specific storage devices associated therewith.

Having knowledge of the network inventory, the qualitative attributes defining the requirement for the partition table and the drive type associations, deployment server 104 processes this information to map out and create a partition table for computers 102 within the network inventory (Step S208). For each computer 102 in the inventory, deployment server 104 evaluates chart 300 to determine the partitions required, and matches the storage devices associated with that computer 102 with the qualitative attributes using association chart 400 and/or the relative association rules to create the partition table. Once the partition table has been created, deployment server 104 performs those steps necessary to create mappings to remote storage devices, if necessary, and installs the OS to the computer 102 (Step S210). By way or non-limiting example, OS installation can be based on "pushing" the OS to computer 102, or using a scripting toolkit in which the inventory data is queried programmatically at the time that a scripting install is being performed. This process continues for each computer 102 in the inventory (S212).

Figure 5:
FIG. 5 is an exemplary partition table created in accordance with the principles of the present invention.
Figure 6:
FIG. 6 is another exemplary partition table created in accordance with the principles of the present invention.

Exemplary partition tables resulting from the mapping and partition table creation Step S208 are shown in FIGS. 5 and 6. These partition tables are derived from the attributes in Table 1 above as well as exemplary charts 300 and 400 in FIGS. 3 and 4, respectively. Referring first to FIG. 5, partition table 500 is shown for a computer 102, such as computer 102a having an inventory of IDE drives and a fibre-attached SAN. Such a computer may be a BLADECENTER with IDE computer blades. As is shown, partition "/" is mapped to an IDE mount point having a 1,000 MB size. The partition has been named "/dev/hda1" in accordance with Linux partition naming conventions. As another example, partition "/database" has been mapped to a fibre-attached mount point having a size of 1,000,000 MB. The partition has been named "/dev/sdb2" in accordance with Linux partition naming conventions. All partitions, including the "/" and "/database" partitions comply with the partition table requirements set out in chart 300.

Referring to FIG. 6, partition table 600 is shown for a computer 102, such as computer 102b, having an inventory including a locally attached RAID and NAS. Using the same partition table requirement chart 300 as was used in the example shown in FIG. 5, this time partition "/" is mapped to a RAID (SCSI) mount point having a 1,000 MB size. The partition has been named "/dev/sda1" in accordance with Linux partition naming conventions. The partition "/database" has been mapped to a NAS mount point having a size of 1,000,000. The partition has been named "/mnt/data" in accordance with Linux partition naming conventions. All partitions, including the "/" and "/database" partitions comply with the partition table requirements set out in chart 300.

Accordingly, as is readily seen from the examples shown in FIGS. 5 and 6, the user established a single task using qualitative attributes, and deployment server 104 mapped these attributes within the context of the inventory and relative deployment rules to create a customized partition table for each computer 102.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for remotely deploying an operating system to one or more computers using a communication network, the system comprising: a deployment server, the deployment server in data communication with the one or more computers via the communication network, the deployment server comprising: a deployment server storage device, the deployment server storage device storing an inventory of the computers to which an operating system is to be deployed and a set of partition table requirements defined by one or more qualitative attributes associated with one or more computer storage device partitions; a central processing unit in communication with the deployment server storage device, the central processing unit executing functions to map the inventory with the set of partition table requirements to create a partition table for each computer to which the operating system is to be deployed.

2. The system according to claim 1, wherein the deployment server central processing unit further executes functions to deploy the operating system to each computer to which the operating system is to be deployed using the partition table for the corresponding computer.

3. The system according to claim 1, wherein the inventory includes one or more remote storage devices, and wherein the partition table includes partitions associated with at least one of the one or more remote storage devices.

4. The system according to claim 3, wherein the deployment server central processing unit further executes functions to configure the one or more remote storage devices to support remote mappings to support partitions on the one or more remote storage devices.

5. The system according to claim 1, wherein the qualitative attributes define a set of partition table requirements and include values for one or more of locality, type, reliability, availability and performance.

6. A method for remotely deploying an operating system to one or more computers using a communication network, the method comprising: storing an inventory of the computers to which an operating system is to be deployed and a set of partition table requirements defined by one or more qualitative attributes associated with one or more computer storage device partitions; and mapping the inventory with the set of partition table requirements to create a partition table for each computer to which the operating system is to be deployed.

7. The method according to claim 6, further comprising deploying the operating system to each computer to which the operating system is to be deployed using the partition table for the corresponding computer.

8. The method according to claim 6, wherein the inventory includes one or more remote storage devices, and wherein the partition table includes partitions associated with at least one of the one or more remote storage devices.

9. The method according to claim 6, wherein mapping includes evaluating values of the qualitative attributes for each partition using one or more of a set of mapping rules and an association of particular types of storage devices with one or more qualitative attributes.

10. The method according to claim 9, wherein the qualitative attributes defining the set of partition table requirements include values for one or more of locality, type, reliability, availability and performance.

11. The method according to claim 10, wherein the qualitative attributes further include one or more of a minimum storage device size and a maximum storage device size.

12. A machine readable storage device having stored thereon a computer program for remotely deploying an operating system to one or more computers using a communication network, the computer program comprising a set of instructions which when executed by a machine causes the machine to perform a method including: storing an inventory of the computers to which an operating system is to be deployed and a set of partition table requirements defined by one or more qualitative attributes associated with one or more computer storage device partitions; and mapping the inventory with the set of partition table requirements to create a partition table for each computer to which the operating system is to be deployed.

13. The method according to claim 12, further comprising deploying the operating system to each computer to which the operating system is to be deployed using the partition table for the corresponding computer.

14. The method according to claim 12, wherein the inventory includes one or more remote storage devices, and wherein the partition table includes partitions associated with at least one of the one or more remote storage devices.

15. The method according to claim 12, wherein mapping includes evaluating values of the qualitative attributes for each partition using one or more of a set of mapping rules and an association of particular types of storage devices with one or more qualitative attributes.

16. The method according to claim 15, wherein the qualitative attributes defining the set of partition table requirements include values for one or more of locality, type, reliability, availability and performance.

17. The method according to claim 16, wherein the qualitative attributes further include one or more of a minimum storage device size and a maximum storage device size.

* * * * *